Jan. 29, 1935. T. J. SMULSKI 1,989,296
WIPER BLADE
Filed May 16, 1934
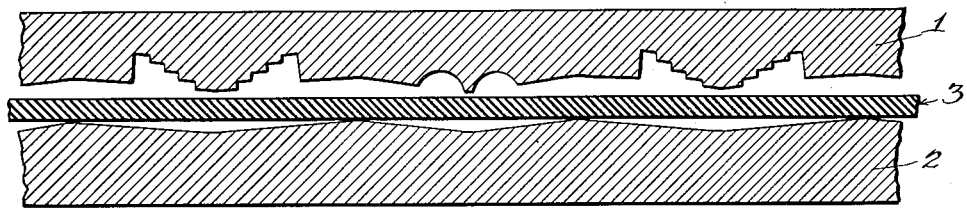
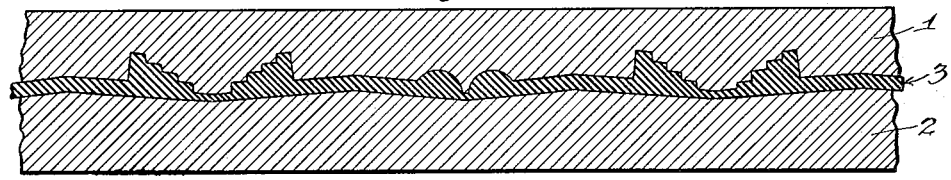
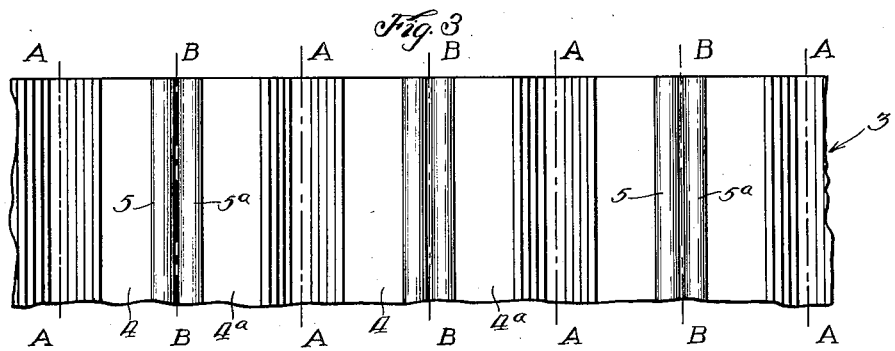
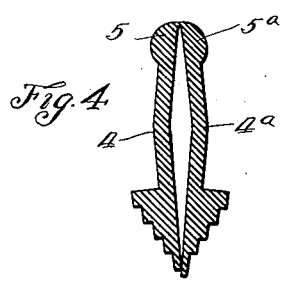 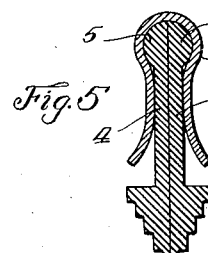 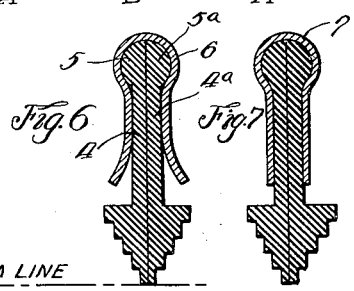 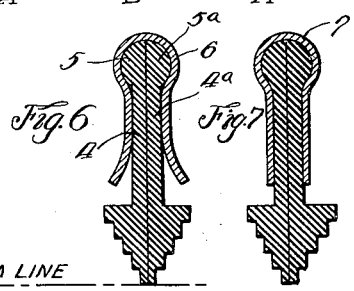
TRIM LINE
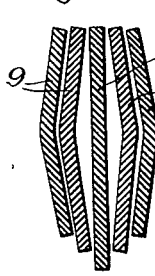 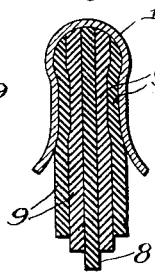 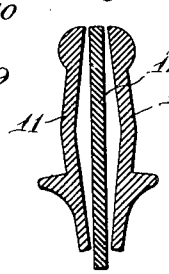 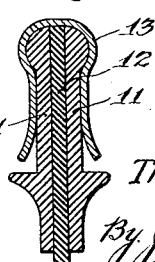
Inventor;
Theodore J. Smulski,
By Jones, Addington,
Ames & Seibold. Attys.

UNITED STATES PATENT OFFICE 1,989,296

WIPER BLADE

Theodore J. Smulski, Gary, Ind., assignor to The Anderson Company, Gary, Ind., a corporation of Indiana Application May 16, 1934, Serial No. 725,834

4 Claims. (Cl. 15—245)

This invention relates to windshield wipers and has special reference to an improved form of flexible ply for use in the manufacture of multi-ply wiper blades or swipes as they are generally known.

More particularly this invention relates to a multi-ply wiper blade comprising two or more independently flexible members, preferably of rubber, so formed that when placed longitudinally and suitably clamped in a holder or backing strip, preferably formed with an enlarged loop at the closed side, the projecting wiping edges will be held and at all times be urged inwardly one against another.

In order to eliminate the spreading of the wiping edges and the constant urging outwardly from the center of the wiping element or blade of each of said strips or layers and the entering into the openings thus formed between the various wiping edges of sand, dust, cinders and other foreign substances, causing a distortion of the wiping edges and a scratching of the surface to be cleaned, it is essential that the various plies and particularly the wiping edges thereof, fit tightly together under all conditions and that each of said plies be constantly urged toward the center of the wiping element and against the next adjacent ply.

Heretofore, in so far as applicant is aware, all wiper elements of a multi-ply or multi-layer formation have consisted of two or more flat rubber wiper strips formed from sheets of flat rubber clamped within a metal or other backing strip, the free edges of these strips being relied upon for obtaining a clean wiping contact with the surface to be cleaned or wiped.

In the manufacture of such wipers, the clamping of the plies of flat rubber within the backing strip and the resulting constant pressure of the metal backing strip against the within clamped plies required to hold the same in position, causes the free or wiping edges of the strips to be separated and to be constantly urged outwardly from the center of the wiping element and away from each other. In the present construction the plies, or layers, are so extruded, formed or molded that when two of such plies, or two or more with a flat center ply, or layer, are suitably clamped in a metal or other backing strip, the projecting wiping edges are held together and due to the resiliency of the rubber the stresses created in the backing strip and the initial form and shape thereof, the wiping edges are constantly urged inwardly one against the other.

Each ply preferably comprises a molded rubber strip, the outer surface being of a shape suitable to the type of wiper element being manufactured, and the opposite inner contacting surface being concave. Being of the shape above described, the upper and lower edges of each of the plies, when positioned with the concave surfaces facing each other in a metal or other backing strip, will be in close contact and when the plies are suitably clamped in the backing strip the free or wiping edge, or edges, due to the resiliency of the rubber and the stresses created therein, will be constantly and strongly urged one against the other. The wiping element may be formed, for example, of two of such plies; two plies together with an intermediate flat strip or in many other ways that are readily apparent to one skilled in the art.

One of the objects of this invention is to provide a form of blank for use in wipers or squeegees of the multi-ply formation in which the wiping face is composed of a plurality of independently flexible edges, which, when suitably clamped in a metal or other backing strip and due to the form and shape thereof, the resiliency of the rubber and the stresses created therein, will be constantly urged one against the other.

Another object of this invention is to provide a form of blank for use in the manufacture of multi-ply wiping elements which, when suitably clamped in a metal or other backing strip, will insure exclusion of foreign substances from entering between the wiping edges, the entering of which substances prevents a true wiping contact of the rubber wiping edges with and causes the scratching of the surface to be cleaned.

Another object of this invention is to provide a form a blank for use in wipers or squeegees of the multi-ply type which will, when suitably clamped in a metal or other backing strip, prevent the separation of the free surface engaging edges thereby excluding from entry between said plies all foreign substances.

Other objects and advantages will be hereinafter more particularly pointed out, and for a more complete understanding of the characteristic features of this invention reference may now be had to the following description when taken together with the accompanying drawing, in which latter:

Figure 1 is a sectional view of a mold used for forming the blank for use in one type of multi-ply wiping element, the mold being in an open position with a sheet of uncured rubber in position for being acted upon;

Fig. 2 is a view similar to Figure 1 showing the mold in the closed position, with the blank formed or molded and ready for curing by the application of heat;

Fig. 3 is a fragmentary plan view of a blank consisting of several of the plies after forming and curing and prior to the separation thereof one from the other;

Fig. 4 is a vertical sectional view of one type of wiper blank utilizing two of the plies in position for clamping in backing strip;

Fig. 5 is a vertical sectional view of the plies shown in Fig. 4 clamped in backing strip and before trimming of projecting wiping edges;

Fig. 6 is a vertical sectional view of the plies clamped in backing strip and with projecting wiping edge trimmed;

Fig. 7 is a vertical sectional view of the plies shown in Fig. 5 and another form of backing strip in which said plies are clamped;

Fig. 8 is a vertical sectional view of a modified form of construction employing a plurality of separated blanks, the blanks being held in position for insertion and clamping by a metal or other backing strip;

Fig. 9 is a vertical sectional view of the plies shown in Fig. 8 fixedly held in a unitary construction by a metal backing strip;

Fig. 10 is a vertical sectional view of a further modified form of construction employing a plurality of separately formed blanks, the blanks being held in position for clamping by a backing strip; and Fig. 11 is a vertical sectional view of the plies shown in Fig. 10 fixedly held in a unitary construction by a suitable backing strip.

Referring to the drawing, and more particularly to Figs. 1, 2 and 3 thereof, the numeral "1" designates the female and "2" the male portions of a form or mold made use of in one method of molding or forming the ply, or layer, comprising the invention. With this method any convenient or desired number of plies, or layers, may be made in one sheet, depending upon the most practical extent and area of the members 1 and 2, by placing a sheet of uncured rubber 3 upon the male portion of the mold 2 and applying sufficient pressure to either 1 or 2, or both 1 and 2, to close the mold to a point where the blank 3 has been compressed to the desired thickness, as shown in Fig. 2. The mold is so subjected to heat as to cure the blank and cause it to retain that form and shape imparted to it by the molding process.

In Fig. 3 a fragmentary plan view is shown of one form of blank consisting of several of the plies, or layers, after molding and curing in the apparatus shown in Figs. 1 and 2 and prior to the separation of the plies, one from the other. Of course, it is to be understood that the blanks may be formed of flexible materials other than rubber and in various other manners aside from molding. Further, that the method described is merely for illustrative purposes in order to teach one operative method.

After the formation of the sheet of blanks from a flexible material in any desired manner, the blanks are cut into individual elements for assembly in a holder of any usual type. By referring to Fig. 3, the blanks may be cut along the lines A—A to form complementary portions of a single piece or the blanks may be cut along both the lines A—A and B—B to form complementary portions of separated pieces as desired.

Referring now particularly to Figs. 4 to 6, both inclusive, one embodiment of the invention is shown wherein one of the blanks comprising complementary portions 4 and 4ª of a single continuous piece are folded one upon the other, the portions being folded on a definite line of demarcation provided between complementary head portions 5 and 5ª. It will be noted that when the plies, or layers, are initially brought together in a normal condition as shown in Fig. 4, they are in contact one with the other at both the top and bottom edges only, the facing surfaces being bowed away from each other. In Fig. 5 the two plies or complementary portions 4 and 4ª have been inserted and clamped within the backing strip 6 so that the facing surfaces contact throughout their length. It may be found that the free or projecting edges project one beyond the other due to the shape and form of the blanks and the stresses created therein by the clamping thereof within the metal or other backing strip which cause the free edges thereof to be urged inwardly one against the other. In such case the same may be trimmed after assembly on the trim line shown in Fig. 6. In Fig. 7 the same embodiment of blank is shown as has been just described with the exception of the form of the backing strip 7 which in this instance has straight edges and lacks the flared extension thereof.

Referring to Figs. 8 and 9, another embodiment of this invention is shown wherein a multi-ply wiper is provided in which the several plies project from the holder an increasingly greater distance from the outermost plies toward a center ply. This construction has been formed by using a flat rubber or other flexible center ply 8 between four or more of the formed or molded flexible layers, or plies 9, the concave or inwardly bowed surfaces of two of which plies, or layers, are faced toward each of the two flat sides of the center ply 8, with the upper and lower edges thereof engaging in the normal condition thereof. In Fig. 9 the multi-ply wiping element has been inserted and clamped within the backing strip 10, the free wiping edges, due to the form of the ply, the pressure of the backing strip and the stresses created in said plies, being all constantly urged inwardly one against the other.

Referring now more particularly to Figs. 10 and 11, the invention is shown as comprising a pair of normally bowed outer plies 11 with the concave surfaces thereof facing a straight center ply 12. When the outer and central plies are assembled in a holder 13, the contacting surfaces are forced into a straight plane and because of the stresses created in the plies, the wiping edges are urged constantly against each other to prevent spreading.

In any of the modifications above described, the outer plies are initially bowed in a direction outwardly so that the edges thereof meet when the plies are moved together before the intermediate portions thereof. Thus there is no tendency for the edges to separate when assembled in a holder with the abutting surfaces occupying a straight plane and, as a matter of fact, the edges are constantly urged toward each other.

While several embodiments of this invention are herein shown and described, it is to be understood that various modifications thereof may be apparent to those skilled in the art without departing from the spirit and scope of this invention and, therefore, the same are only to be limited by the scope of the prior art and the appended claims.

I claim:

1. An elongated wiper blade comprising a pair of flexible plies disposed face to face and having internal stresses therein for creating a tendency for said plies to assume relatively outwardly bowed positions transversely of said blade, and a holder for clamping said plies together at one set of opposed longitudinal edges to urge said faces in contact over the entire surface thereof whereby the internal stresses obviate spreading of the free opposed wiping edges.

2. An elongated wiper blade comprising a flexible element in a single piece folded to form plies disposed face to face and having internal stresses therein for creating a tendency for said plies to assume relatively outwardly bowed positions transversely of said blade, and a holder for clamping said plies together at one set of opposed longitudinal edges to urge said faces in contact over the entire surface thereof whereby the internal stresses obviate spreading of the free opposed wiping edges.

3. An elongated wiper blade comprising a plurality of flexible plies disposed side by side, at least the outermost plies thereof having internal stresses therein for creating a tendency for assuming relatively outwardly bowed positions transversely of said blade when viewed in lateral cross-section, and a holder for clamping said plies together at one set of opposed edges to urge a contact over the entire surfaces of adjacent sides whereby the internal stresses obviate spreading of the free opposed wiping edges.

4. An elongated wiper blade comprising a pair of flexible plies disposed face to face and having complementary enlargements along the longitudinal edges thereof, a plurality of wiping edges on one set of enlargements, and a holder for enveloping the other set of enlargements, said plies having internal stresses therein for creating a tendency for said plies to assume relatively outwardly bowed positions transversely of said blade and said holder clamping said enlargements to urge the faces of said plies in contact over the entire surface thereof whereby the internal stresses obviate spreading of said plies at the wiping edges thereof.

THEODORE J. SMULSKI.